J. MONGAN.
MEANS FOR PREVENTING AUTOMOBILE THEFTS.
APPLICATION FILED OCT. 25, 1919.

1,368,519. Patented Feb. 15, 1921.

J. MONGAN.
MEANS FOR PREVENTING AUTOMOBILE THEFTS.
APPLICATION FILED OCT. 25, 1919.
1,368,519.   Patented Feb. 15, 1921.
2 SHEETS—SHEET 2.
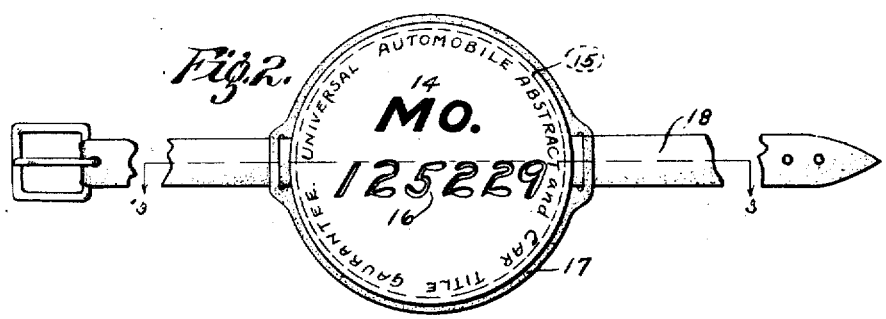
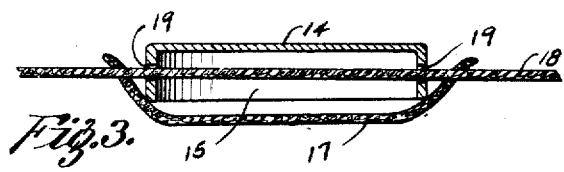

UNITED STATES PATENT OFFICE.

JOHN MONGAN, OF EAST ST. LOUIS, ILLINOIS.

MEANS FOR PREVENTING AUTOMOBILE-THEFTS.

1,368,519.  Specification of Letters Patent.  Patented Feb. 15, 1921.

Application filed October 25, 1919. Serial No. 333,398.

*To all whom it may concern:*

Be it known that I, JOHN MONGAN, a citizen of the United States, residing at East St. Louis, in the county of St. Clair and State of Illinois, have invented certain new and useful Improvements in Means for Preventing Automobile-Thefts, of which the following is a specification containing a full, clear, and exact description, reference being had to the accompanying drawings, forming a part hereof.

My invention consists in the novel disclosure hereinafter particularly described and distinctly claimed.

The object of my invention is to provide an improved means for preventing automobile thefts, in such a manner that a national or universal deed or abstract-of-title for each protected car will be issued to the car-owner after same has been made in duplicate, together with an additional identifying numbered evidence of ownership of said car which is used in combination with the said abstract-of-title.

In the drawings,

Figure 1 is a front face-view of the deed of abstract-of-title sheet, in duplicate, the separate sections of same being detachably connected by perforated lines, the duplicate parts being shown broken away, to economize in drafting space.

Fig. 2 is a top plan-view of the owner's title badge or tag that is used in combination with the sheets shown in Fig. 1, and Fig. 3 is a vertical section through the badge or tag, on line 3—3 of Fig. 2.

In the present form of my invention, which is illustrated herein, the numeral 1 designates the original sheet of the deed or abstract-of-title, and the numeral 2 designates the duplicate thereof, detachably connected to one of the side-edges of said original by a line of indentations or perforations 3.

At the bottom of both the original and duplicate sheets 1 and 2 there is formed a horizontal line of indentations or perforations 4, by means of which a series of coupons or receipts are detachably secured to the said sheets.

Said original and duplicate sheets 1 and 2 are marked with the words "Form 3", and have printed and written upon their front faces or upon some portion of them the matter shown and described thereon, or the legal equivalent thereof.

Said receipts are designated by the numerals 5, 6 and 7, and they are separated from each other by a vertical dotted, perforated or indented line 11, and marked "Form 3ᴬ."

A series of signature coupons 8, 9 and 10 are attached to the lower edges of the said receipts by an indented line 12, so that said signature coupons may be readily detached, when required for filing with the duplicate, at the headquarters or office of the corporation which furnishes the abstract, which may be done by pasting the receipts containing the signatures of the car owners on the duplicate receipts in the office of the abstract corporation.

Said receipts are marked "Form 3ᴮ," for further identification.

In use, said receipts being filled out, as shown, prevents the selling of a stolen car, because a buyer knowing about this abstract, will refuse to purchase a second-hand car unless he can get a good title to same.

In order to prevent the theft of automobiles it is necessary to prevent the cause.

Automobiles are stolen in most cases to sell again, and if thieves cannot sell the cars they have stolen they will quit stealing cars.

Hence, without an abstract of title, it will in the future be almost impossible to sell a second-hand or used car.

The abstract of title 1 (form 3), because of the information it conveys, prevents the selling of a stolen car having the definite engine number, and definite license number, that are written upon the face of said abstract sheet 1 corresponding to the actual number of the engine and license of said car.

Said abstract sheet 1 is to be issued to the car owner, while a duplicate 2 of said sheet is to be kept on file at the clearance office, for record purposes, year after year.

Said duplicate detachable receipts 5, 6 and 7, are to be filled out and issued by the clearance office only, in order to prevent counterfitting of the abstract sheet.

Said owner's signature coupons 8, 9 and 10, (form 3ᴮ) enable the owner of a car to furnish his signature, for filing at the clearance office, as a further preventive of theft.

A thief or other person that would offer a stolen car for registration in the clearance office would thus find that the real owner's signature was or file, as shown.

A metallic (or other suitable) deed or additional evidence of ownership of the protected car, may be made in the form of a badge or fob 14 is made with an integral upstanding flange 15, to prevent easy counterfeiting of same, and the license-number 16 of the registered car is cut through or into the material of said badge or fob, and this latter is issued to the owner of the car that has its license number corresponding to that written in the abstract sheet 1 in duplicate.

This badge or additional evidence of ownership is to be carried by the owner or his driver, and for convenience, it may be fitted with a leather back-piece 17 and a buckled strap 18, to be fastened around the wrist.

The said flange 15 is provided with opposite openings 19 for the passage of the said wrist-strip 18, when the badge or fob is carried on the wrist.

In the present illustration of the badge 14, the words "Universal automobile abstract and car title guarantee" are printed or otherwise placed upon the face of said badge, for an obvious purpose, as is also the name of the State which issued the license of the car.

If a suspected thief is caught on a car and contends that he owns the car, but has no numbered deed or badge to prove his ownership, he can then be forced to prove his ownership by other means.

A thief could not steal a car and its owner's badge at the same time, and hence he could not register the car and get an abstract for same without producing the badge or other form of title evidence for the stolen car.

Neither could a thief send in for an abstract without getting caught, as the signature of the owner on form 3<sup>B</sup> is on file in the clearance office, and that is required with all sales or transfers of cars.

By the use of my invention, a complete record of all cars that have been manufactured and used, may be made.

The various abstract-issuing offices will be able to render valuable assistance to the license-issuing offices of the States in which said license-issuing offices are located, especially in preventing the illegal running of a number of cars under one license-plate.

It will be impossible for a person with a stolen car to obtain a license without getting caught, even though that person may change the numbers, paint the car in a different color, or even store the stolen car for a long time.

By the use of my invention, a purchaser paying from $500.00 up for a car or truck, may secure positive protection against the theft thereof, and said protection will be of an exceptionally low cost.

Thus a thief would be effectually prevented from getting rid of his plunder, and automobile thefts would be stamped out all over the country.

I claim:—

The combination of a title deed sheet in duplicate sections separated by an indented line, said sections having appropriately designated spaces for the name of the owner of a car and other data concerning said car, and having appropriately designated spaces for the insertion of the license-number and the engine-number of said car, receipt coupons detachably connected to said title deed sheet by indented lines, and owner's signature coupons detachably connected to said sheet by indented lines.

In testimony whereof, I have signed my name to this specification in the presence of two subscribing witnesses.

JOHN MONGAN.

Witnesses:
 IDA PHILLIPS,
 JOHN C. HIGDON.